(12) United States Patent
Hsieh

(10) Patent No.: US 7,157,636 B2
(45) Date of Patent: Jan. 2, 2007

(54) TWO-LEGGED CYMBAL SUPPORT FOR USE WITH A CYMBAL ASSEMBLY

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 524 days.

(21) Appl. No.: 10/461,397

(22) Filed: Jun. 16, 2003

(65) Prior Publication Data
US 2003/0209128 A1 Nov. 13, 2003

Related U.S. Application Data

(63) Continuation-in-part of application No. 09/932,991, filed on Aug. 21, 2001, now abandoned.

(51) Int. Cl.
*G10D 7/10* (2006.01)
(52) U.S. Cl. .................... 84/387 R; 84/422.3
(58) Field of Classification Search ............... 84/422.3, 84/421, 327, 329, 379, 453; 248/443
See application file for complete search history.

(56) References Cited

U.S. PATENT DOCUMENTS 5,647,563 A * 7/1997 Gantner et al. ............ 248/74.1
6,020,548 A * 2/2000 Kurosaki .................... 84/421
6,096,956 A * 8/2000 Hoshino ..................... 84/421
6,259,011 B1 * 7/2001 Liao ........................... 84/421

\* cited by examiner

*Primary Examiner*—Lincoln Donovan
*Assistant Examiner*—Jianchun Qin
(74) *Attorney, Agent, or Firm*—Bacon & Thomas

(57) ABSTRACT

A two-legged cymbal support for a cymbal assembly includes two legs, two connecting ribs and two clamping devices. First distal ends of the two legs are pivotally connected to one of the clamping devices and second distal ends of the two legs are supported on the ground. First distal ends of the two connecting ribs are pivotally connected to the other one of the two clamping devices and second distal ends of the two connecting ribs are pivotally connected to the two legs. Each clamping device has a first arcuate recess and a second arcuate recess complimentarily corresponding to the first arcuate recess such that when the first and second arcuate recesses are combined to form a circular space, the pole of the cymbal assembly is clamped therebetween. When the first and second arcuate recesses are separate, the pole is easily removed.

1 Claim, 6 Drawing Sheets

TWO-LEGGED CYMBAL SUPPORT FOR USE WITH A CYMBAL ASSEMBLY

CROSS REFERENCE

This application is a continuation-in-part (CIP) of the application filed on Aug. 21, 2001 with the application Ser. No. of 09/932,991, now abandoned, by the same applicant of this application. The content of the application is incorporated for reference hereinafter.

BACKGROUND OF THE INVENTION

1. Field of the Invention

The present invention relates to a two-legged cymbal support, and more particularly to the two-legged cymbal support for use with a cymbal assembly to support the cymbal assembly on a surface.

2. Description of Related Art

With reference to FIG. 6, a conventional cymbal support includes a first support tube (50) for supporting the cymbal (not numbered) and a supporting assembly (60). The supporting assembly (60) is slidably connected to the support tube (50) and has a base tube (62) receiving therein a part of the support tube (50), legs (61) one end of each of which is pivotally connected to the base tube (62) and the other end of each of which engages the ground and ribs (63) each pivotally connected between a corresponding one of the legs (61) and the base tube (62). With such an arrangement, the conventional support is able to support the cymbal assembly upright. However, when the support is in use, the user has only little space left for maneuver of the cymbal assembly. That is, when the pedal assembly (70), for example, is connected to the support, the pedal assembly can only be changed within a limited space between the legs (61). When the conventional support is connected in series with other instrumental assembly, such as drum sets, the support limits the manner of connection due to the little room available resulting in the multiple legs (61).

Further, the support of this type can only provide height change of the support tube (50) to the base tube (62), the inclination of the legs (61) can not be changed, which further limits the adjustment of the support. Besides, once the support is connected to the cymbal assembly, the support is not easily detached from the cymbal assembly such that when the conventional support is to be removed so that the cymbal assembly is able to connect to other instrumental devices, the operator has to waste a lot of effort to remove the conventional support from the cymbal assembly.

To overcome the shortcomings, the present invention tends to provide an improved two legged support for use with a cymbal assembly to mitigate the aforementioned problems.

SUMMARY OF THE INVENTION

The primary objective of the invention is to provide a two-legged cymbal support and detachably connected to a cymbal assembly such that the operator is able to easily detach the support for connection with other instrumental devices. Other objects, advantages and novel features of the invention will become more apparent from the following detailed description when taken in conjunction with the accompanying drawings.

DETAILED DESCRIPTION OF THE PREFERRED EMBODIMENT

Figure 1:
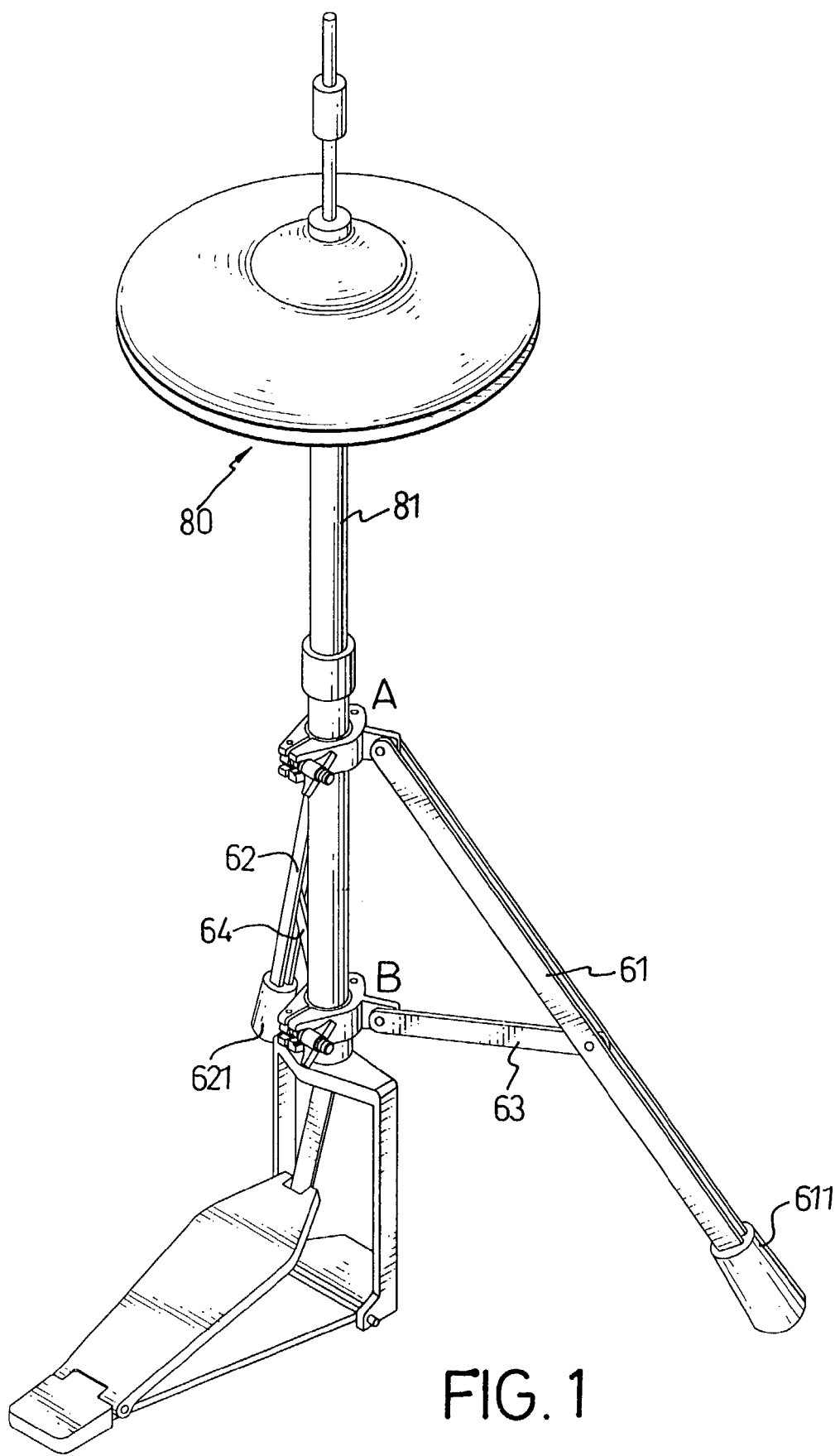
FIG. 1 is a perspective view of the two-legged support of the present invention.
Figure 2:
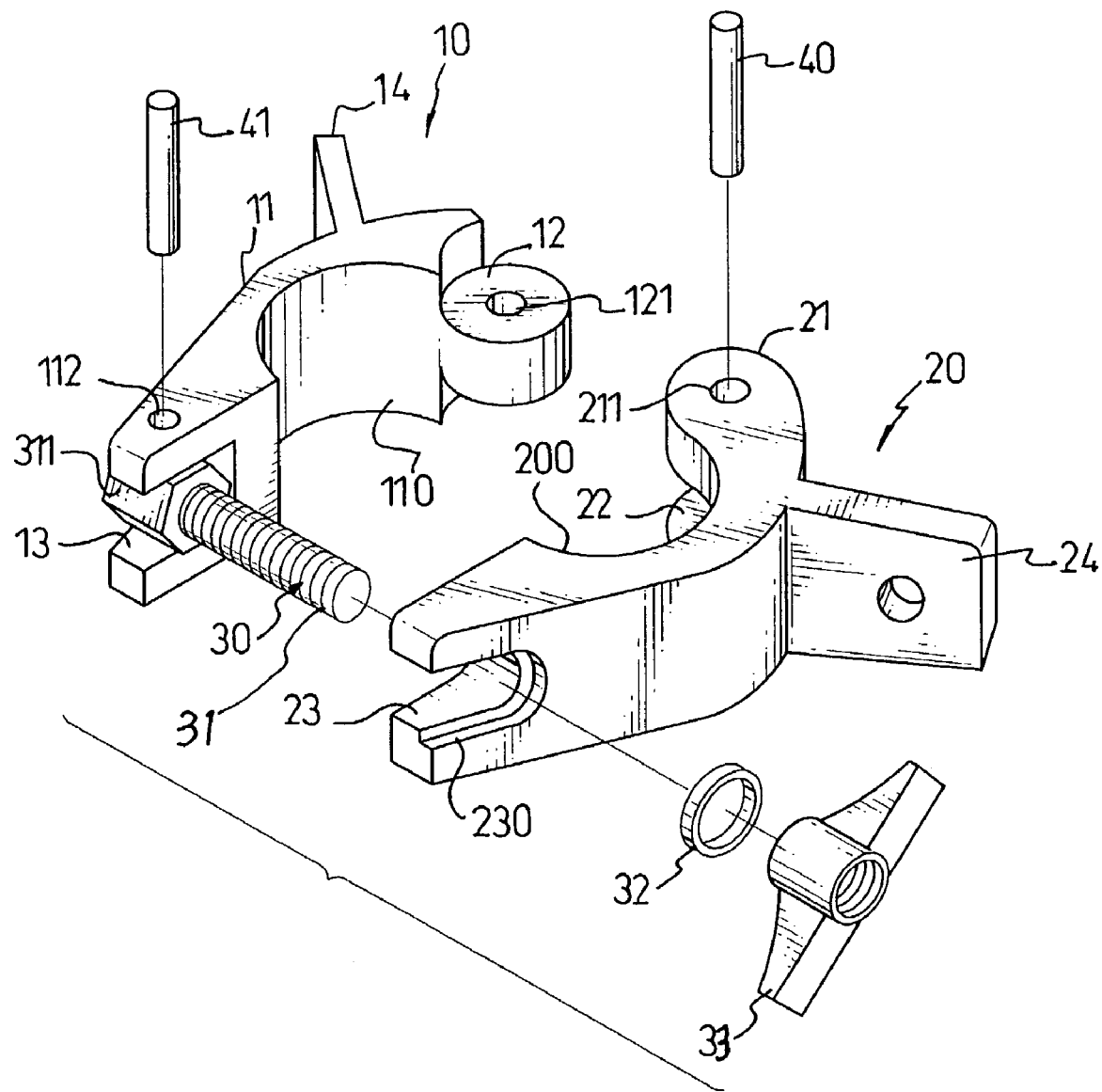
FIG. 2 is an exploded perspective view of the clamping device in accordance with the present invention.

With reference to FIGS. 1 and 2, the two-legged support in accordance with the present invention is adapted to be connected to a pole (81) of the cymbal assembly (80). The two-legged support of the present invention includes a first leg (61), a second leg (62), a first connecting rib (63), a second connecting rib (64) and a pair of clamping devices (A,B) respectively and pivotally connected to first distal ends of the first and second legs (61,62) and of the first and second connecting ribs (63,64). Second distal ends of the first and second legs (61,62) are respectively provided with a rubber pad (611,621) to increase, friction with ground when the second distal ends of the first leg (61) and the second leg (62) are placed on the ground.

With reference to FIG. 2, each of the two clamping devices (A,B) has the same structure as that of the other such that the following detailed description focus on one clamping device only. However, the detailed description is only for descriptive purpose only and should not in any circumstance be deemed as a limit to the scope of the structure as cited hereinafter.

The clamping device includes a first clamping plate (10) and a second clamping plate (20).

The first clamping plate (10) has an arcuate body (11) with a first arcuate recess (110), a disk (12) formed on one distal end of the arcuate body (11) and provided with a hole (121) centrally defined in the disk (12), a first fork (13) formed on the other distal end of the arcuate body (11) and a first connecting plate (14) formed on an outer face of the arcuate body (11). A positioning hole (112) is further defined in a top face of the fork (13) to allow a first positioning pin (41) to extend through the first positioning hole (112).

The second clamping plate (20) is pivotally connected to the first clamping plate (10) and has a second arcuate recess (200) complimentarily corresponding to the first arcuate recess (110) to form a circular space therebetween, two ears (21) horizontally extending from one distal end of the second clamping plate (20) and each ear (21) having a through hole (211) aligned with each other and corresponding to the hole (121) of the disk (12), a gap (22) defined between the two ears (21) to correspond to the disk (12) and a cutout (23) defined in the other distal end of the second clamping plate (20) and having a shoulder (230) formed in a periphery defining the cutout (23).

A securing device (30) is provided to secure the engagement between the first and second clamping plates (10,20) and has a bolt (31) extending through the cutout (23) of the second clamping plate (20) and provided with a head (311)

securely received in the first fork (13) of the first clamping plate (10), a washer (32) received in the shoulder (230) and a retainer (33) abutted to the washer (32) and screwed to the bolt (31).

When the adjusting device of the present invention is in use, the disk (12) is received in the gap (22) to allow the hole (121) to align with the through holes (211) of the pair of ears (21). After the alignment between the through holes (211) and the hole (121), a second positioning pin (40) is able to extend into the aligned through holes (211) and hole (121) to secure the pivotal engagement between the first clamping plate (10) and the second clamping plate (20).

Thereafter, as previously described, because the two-legged cymbal support of the present invention is used for a cymbal assembly (80), the following description is taking the connection between the first leg (61) and the second connecting plate (24) for example.

The first connecting plate (14) is pivotally connected to the second leg (62) and the second connecting plate (24) is pivotally connected to the first leg (61) by means of any suitable method known in the art. Then, the pole (81) is received in the space defined by the first and second arcuate recesses (110,200) of the first clamping plate (10) and the second clamping plate (20) respectively. Thereafter, the retainer (33) is screwed to the bolt (31) to secure the engagement of the first and second arcuate plates (10,20) with the washer (32) received in the shoulder (230) and securely abutted by the retainer (33). After the first positioning pin (41) is inserted into the first positioning hole (112) to abut a face of the head (311) received in the fork (13), the engagement between the clamping device and the pole (81) is thus finished. The engagement between the first connecting rib (63) and the clamping device and the engagement between the second connecting rib (64) and the clamping device may be finished in the same way.

Figure 3:
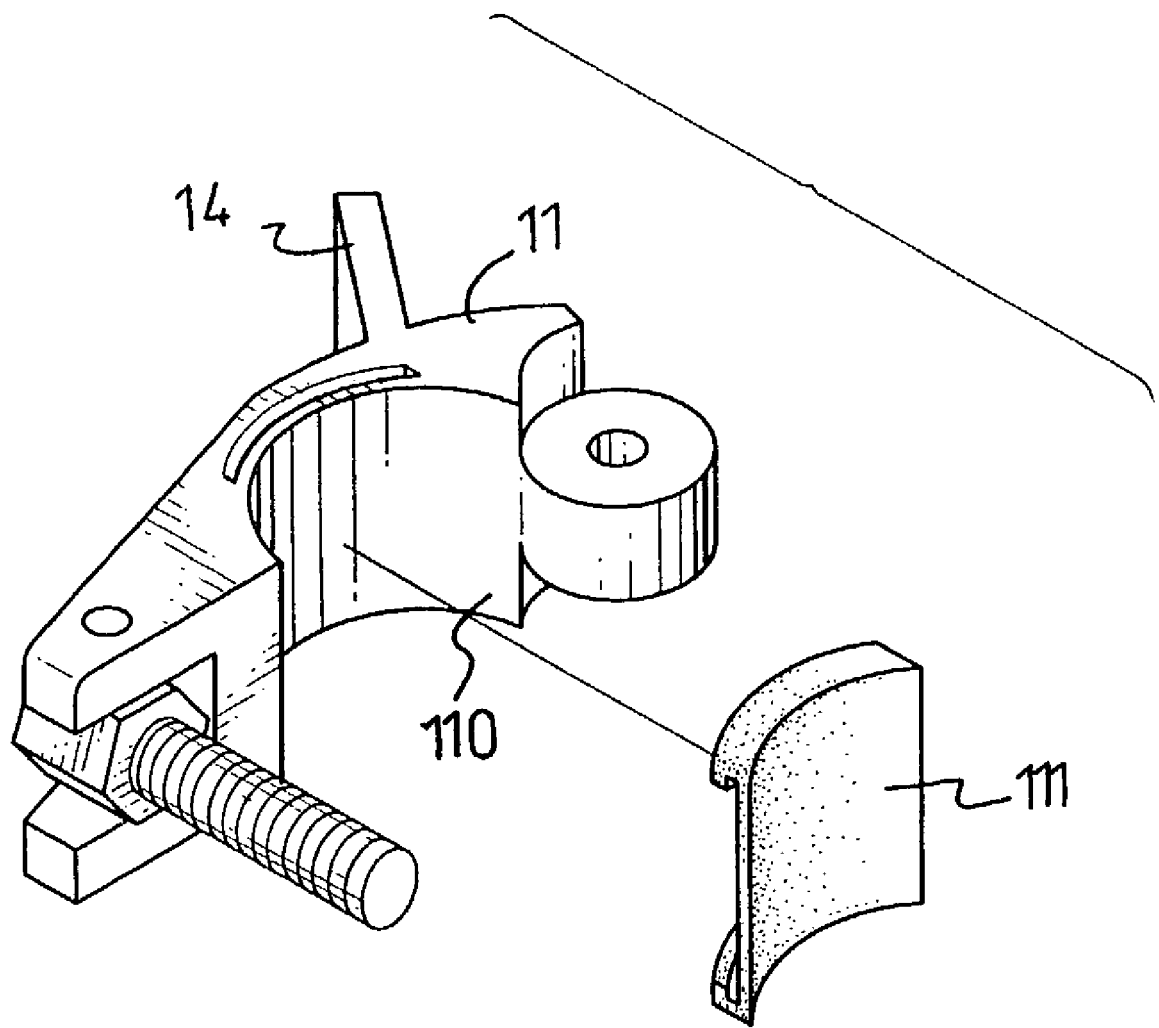
FIG. 3 is an exploded perspective view of a first clamping plate of the clamping device of FIG. 2.

With reference to FIG. 3, to increase friction between the clamping device and the pole (81) of the cymbal assembly (80), a rubber pad (111) is provided in the first arcuate recess (110) such that the rubber pad (111) is able to provide extra friction when engaging with the outer periphery of the pole (81).

Figure 4:
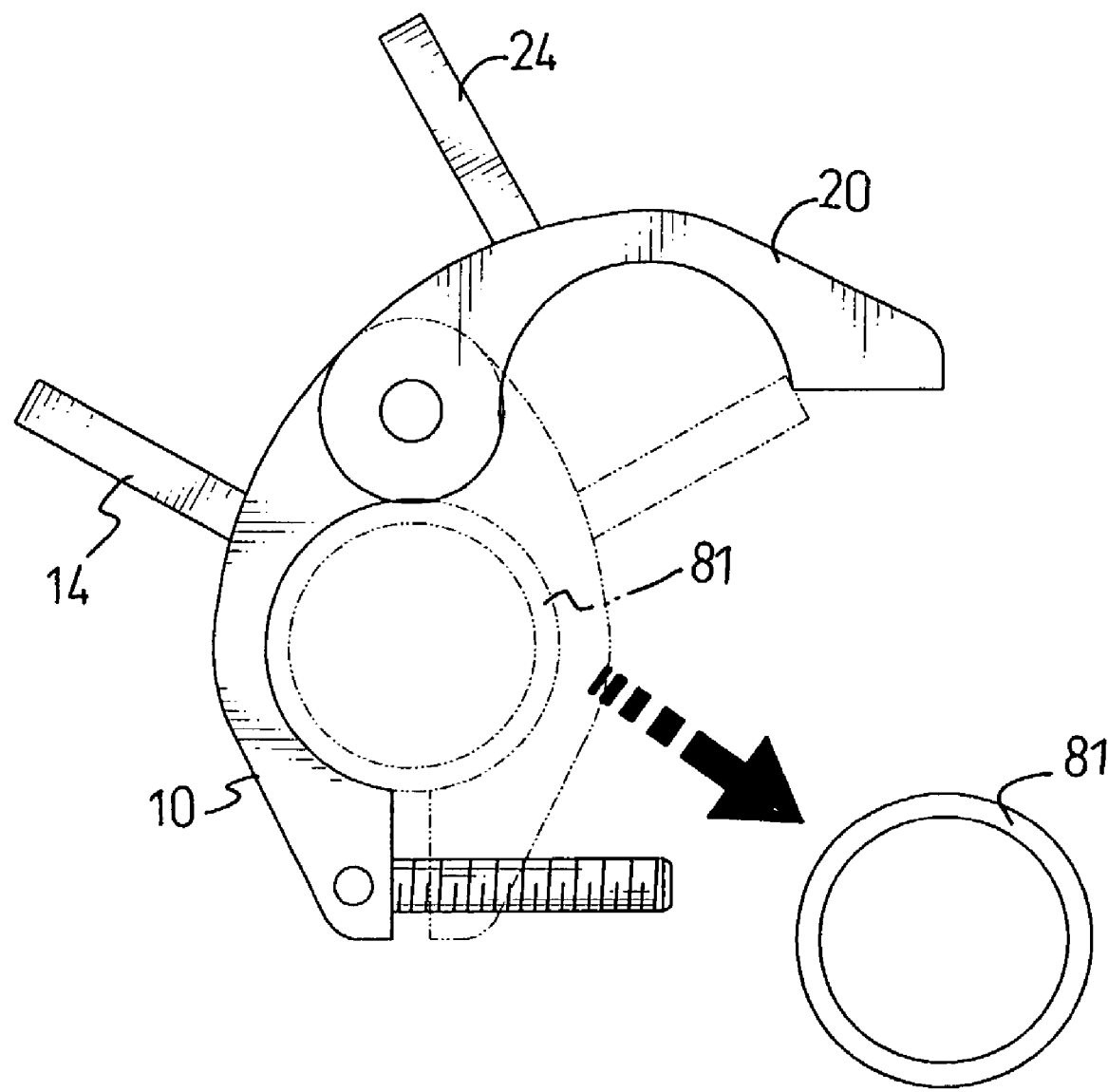
FIG. 4 is an exploded perspective view showing that the two-legged cymbal support is detached from the cymbal assembly.
Figure 5:
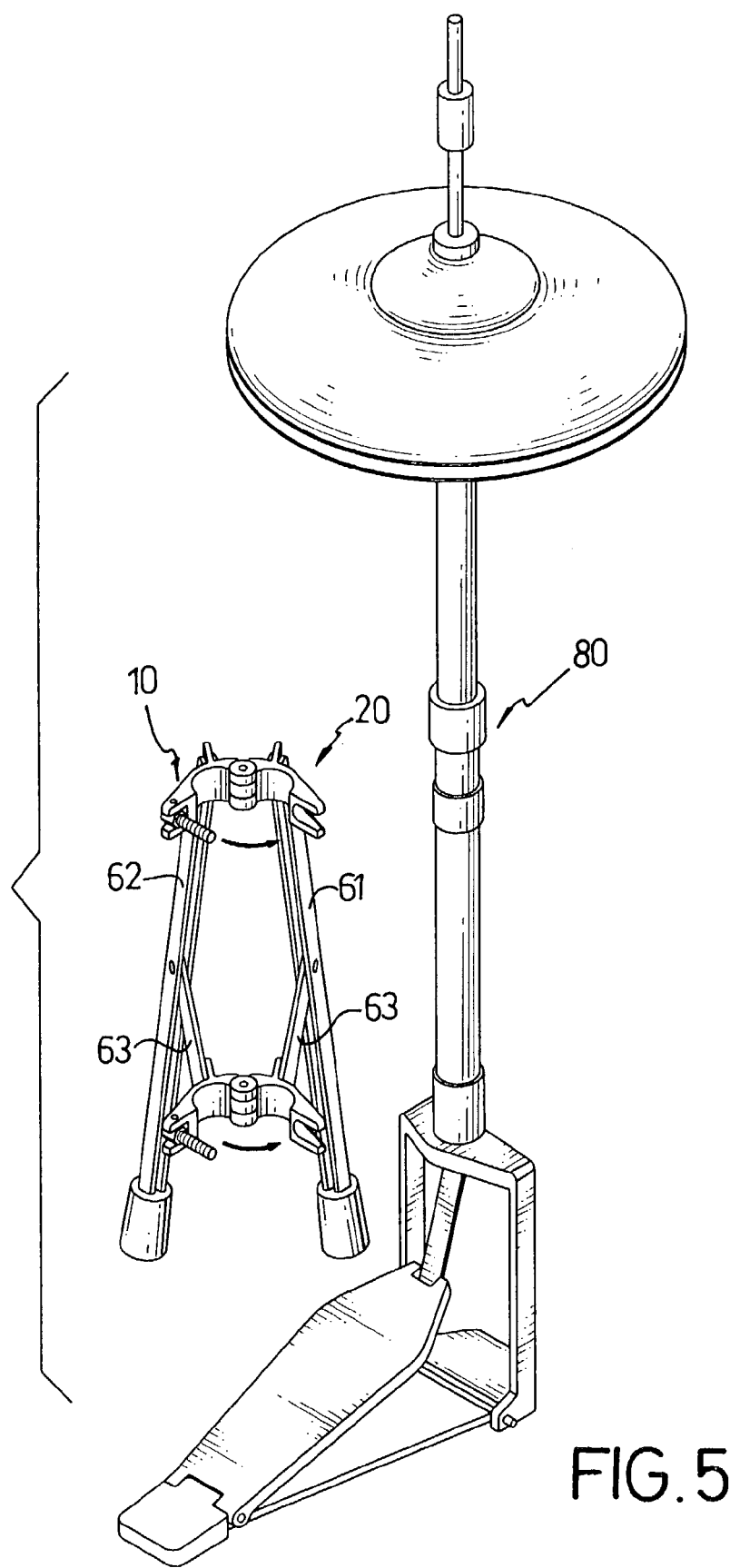
FIG. 5 is a schematic top view showing the pole of the cymbal assembly is removed from the clamping device of the two-legged cymbal support of the present invention.
Figure 6:
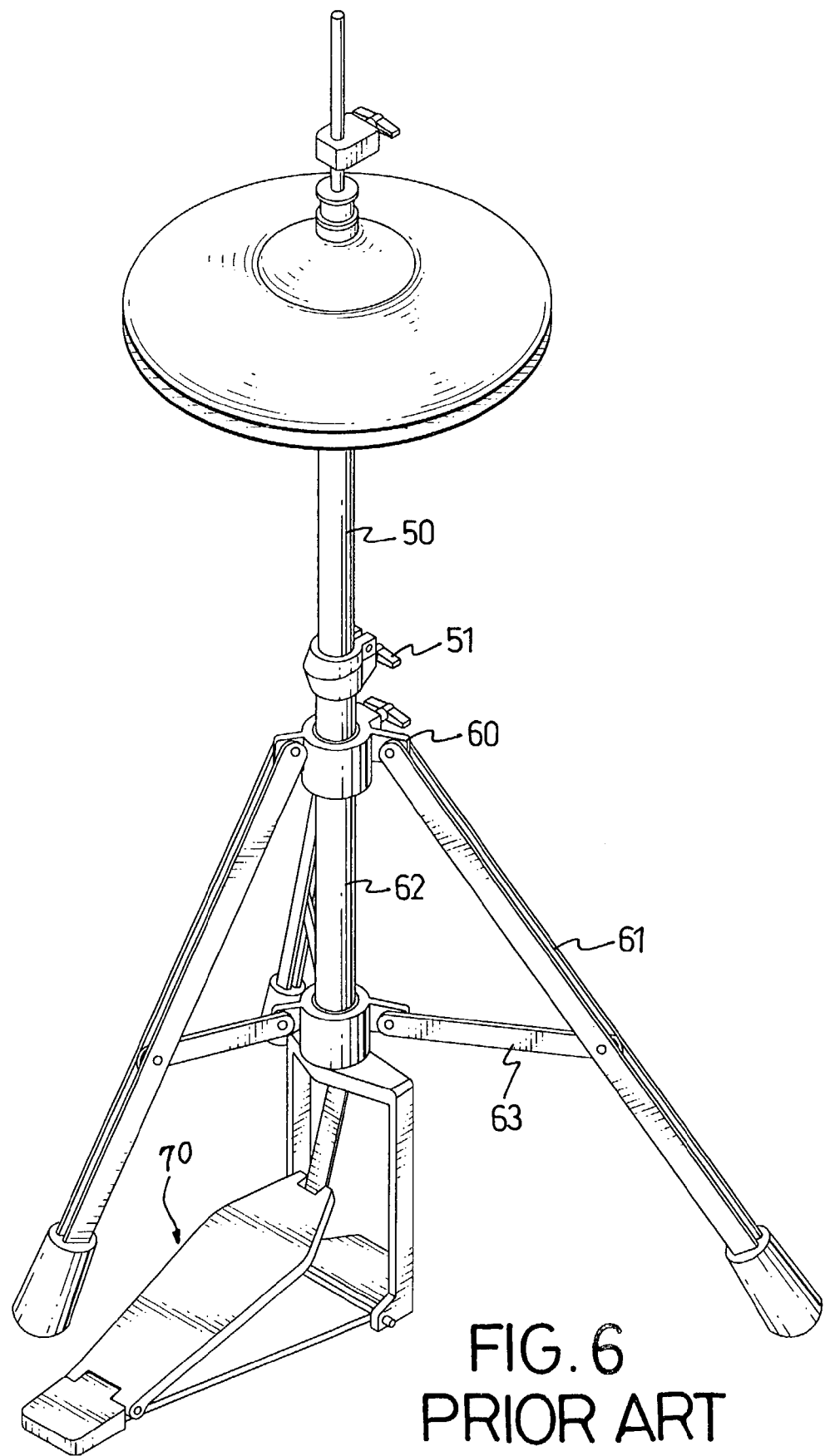
FIG. 6 is a perspective view of a conventional adjusting device for a cymbal stand.

Thus, with reference to FIGS. 4 and 5, when detachment of the two-legged cymbal support from the cymbal assembly (80) is required, the user only needs to unscrew the retainer (33) from the bolt (31) to allow the first (or second) clamping plate (10) (or 20) to pivot relative to the second (or first) clamping plate (20) (or 10) using the connection between the disk (12) and the pair of ears (21) as the pivotal axis. After both clamping devices are deactivated, that is the first clamping plate (10) is away from engagement with the second clamping plate (20) via the unscrew of the retainer (33), the user may easily and quickly remove the two-legged cymbal support from the cymbal assembly (80) and thus the pole (81) of the cymbal assembly (80) is able to be removed from the deactivated clamping device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjusting device for use with a two-legged cymbal support for connection with a pole of a cymbal assembly, the two-legged cymbal support comprising:
   a first leg;
   a second leg;
   a first clamping device having:
   a first clamping plate with a first arcuate recess, a disk formed on a first distal end of the first clamping plate and provided with a hole defined through the disk, a fork formed on a second distal end of the first clamping plate and a first connecting plate formed on an outer periphery of the first clamping plate to pivotally connect to a first distal end of the second leg;
   a second clamping plate with a second arcuate recess defined to complementarily correspond to the first arcuate recess to form a circular space for receiving therein the pole of the cymbal assembly, a pair of ears horizontally formed and extending out from a first distal end of the second clamping plate to correspond to and receive therebetween the disk, each ear having a through hole defined to align with the hole of the disk, a cutout defined in a second distal end of the second clamping plate to correspond to the fork and a second connecting plate formed on an outer periphery of the second clamping plate to pivotally connect to a first distal end of the first leg;
   a first bolt extending through the cutout and provided with a head securely received in the fork; and
   a retainer screwed to the bolt to secure the engagement between the first and second clamping plates so as to secure the holding to the pole in the first and the second arcuate recesses,
   a first connecting rib;
   a second connecting rib;
   a second clamping device having:
   a third clamping plate with a third arcuate recess, a second disk formed on a first distal end of the third clamping plate and provided with a first hole defined through the second disk, a second fork formed on a second distal end of the third clamping plate and a third connecting plate formed on an outer periphery of the third clamping plate to pivotally connect to a first distal end of the second connecting rib, wherein the second connecting rib has a second distal end pivotally connecting to the second leg;
   a fourth clamping plate with a fourth arcuate recess defined to complementarily correspond to the third arcuate recess to form a circular space for receiving therein the pole of the cymbal assembly, a pair of second ears horizontally formed and extending out from a first distal end of the fourth clamping plate to correspond to and receive therebetween the second disk, each second ear having a second through hole defined to align with the first hole of the second disk, a second cutout defined in a second distal end of the fourth clamping plate to correspond to the second fork and a fourth connecting plate formed on an outer periphery of the fourth clamping plate to pivotally connect to a first distal end of the first connecting rib, wherein the second connecting rib has a second distal end pivotally connected to the first leg;
   a second bolt extending through the second cutout and provided with a second head securely received in the second fork;
   a second retainer screwed to the second bolt to secure the engagement between the third and fourth clamping plates so as to secure the holding to the pole in the third and fourth arcuate recesses; and a washer removably sandwiched between a side face defining the cutout and the retainer, wherein a shoulder is defined in the side face defining the cutout so that the washer is able to be securely mounted in the shoulder, wherein a rubber pad is securely received in the first arcuate recess and the third arcuate recess to enhance friction when the first clamping device and the second clamping device are used to hold onto the pole of the cymbal assembly.

* * * * *